United States Patent
Armstrong

(10) Patent No.: US 11,639,158 B2
(45) Date of Patent: May 2, 2023

(54) WHEEL SHIELD APPARATUS

(71) Applicant: Dignity Health, San Francisco, CA (US)

(72) Inventor: Gary Armstrong, San Francisco, CA (US)

(73) Assignee: Dignity Health, San Francisco, CA (US)

( * ) Notice: Subject to any disclaimer, the term of this patent is extended or adjusted under 35 U.S.C. 154(b) by 0 days.

(21) Appl. No.: 17/787,442

(22) PCT Filed: Dec. 21, 2020

(86) PCT No.: PCT/US2020/066386
§ 371 (c)(1),
(2) Date: Jun. 20, 2022

(87) PCT Pub. No.: WO2021/127632
PCT Pub. Date: Jun. 24, 2021

(65) Prior Publication Data
US 2023/0021747 A1   Jan. 26, 2023

Related U.S. Application Data

(60) Provisional application No. 62/950,655, filed on Dec. 19, 2019.

(51) Int. Cl.
*B60R 19/00* (2006.01)
*B60T 3/00* (2006.01)
(Continued)

(52) U.S. Cl.
CPC ............... *B60T 3/00* (2013.01); *B60B 33/00* (2013.01); *B60P 3/077* (2013.01); *B60P 7/0892* (2013.01);
(Continued)

(58) Field of Classification Search
CPC .......... B60T 3/00; B60R 19/00; B60R 19/54; B60R 2019/002; B60B 33/00
See application file for complete search history.

(56) References Cited

U.S. PATENT DOCUMENTS 4,025,099 A * 5/1977 Virden .................... B60B 33/00
293/58
5,170,528 A * 12/1992 Navar ................. B60B 33/0028
280/160
(Continued)

FOREIGN PATENT DOCUMENTS

EP    2598406 B1   5/2014
WO    9529071      11/1995

OTHER PUBLICATIONS

Patent Cooperation Treaty, International Search Report and Written Opinion, International Application No. PCT/US2020/066386, dated Mar. 10, 2021, 8 pages.

*Primary Examiner* — Nicholas J Lane
(74) *Attorney, Agent, or Firm* — Polsinelli PC

(57) ABSTRACT

Disclosed herein is a wheel shield apparatus that includes a pair of elongated parallel tube members in perpendicular engagement with a pair of short parallel tube members, at least one removable side of the wheel shield apparatus is operable to be temporarily opened or removed such that the wheel shield apparatus may be placed around a wheel of a neurosurgical microscope or some other type of heavy wheeled machinery and the removable side may be placed in a closed position such that the wheel shield surrounds the wheel. Each of the pair of elongated parallel tube members and/or each of the pair of short parallel tube members comprises a cavity configured to receive a ballast material to provide sufficient weight to ensure that the wheel shield apparatus contacts the floor such that cables along the floor are pushed out of the way by the wheel shield apparatus and (Continued)

prevented from being run over while the machinery is being transported.

15 Claims, 20 Drawing Sheets

(51) Int. Cl.
  *B60P 3/077* (2006.01)
  *B60P 7/08* (2006.01)
  *B60B 33/00* (2006.01)
  *B60R 19/54* (2006.01)
(52) U.S. Cl.
  CPC ...... *B60R 19/54* (2013.01); *B60B 2900/3312* (2013.01); *B60R 2019/002* (2013.01)

(56) References Cited

U.S. PATENT DOCUMENTS

| | | | |
|---|---|---|---|
| 8,904,597 B2 * | 12/2014 | Long | B60B 33/0023 16/18 CG |
| 9,108,462 B1 * | 8/2015 | Stone | B60B 33/0023 |
| 9,566,926 B1 * | 2/2017 | Dubas | B60T 1/14 |
| 9,669,655 B1 * | 6/2017 | Soliman | B60B 7/04 |
| 9,701,269 B1 * | 7/2017 | Dubas | B60T 3/00 |
| 9,944,120 B1 * | 4/2018 | Butler | B60B 33/0063 |
| D823,098 S * | 7/2018 | Aubin | D8/375 |
| 10,035,499 B2 * | 7/2018 | Lovelady | B60T 3/00 |
| D859,133 S * | 9/2019 | Dubas | D8/375 |
| 2006/0086881 A1 | 4/2006 | Miller | |
| 2015/0259077 A1 | 9/2015 | Wiskus | |
| 2018/0056948 A1 * | 3/2018 | Lovelady | B60T 3/00 |

* cited by examiner

US 11,639,158 B2

WHEEL SHIELD APPARATUS

FIELD

The present disclosure generally relates to medical equipment; and in particular, to a wheel shield apparatus for preventing damage to cables and preventing impediment of motion, in relation to the movement of heavy medical equipment.

BACKGROUND

Common workflow requirements and space management issues in hospitals involve moving heavy medical equipment on wheels from room to room, within surgical operating rooms, and within small, confined spaces. Transporting heavy and expensive equipment, such as a surgical microscope on wheels, can cause power, control, and data cables associated with such equipment and other equipment within the environment to be run over and damaged by the wheels during movement. This, of course, often requires replacement of specialized/proprietary cables of considerable cost which can render the equipment unusable for an extended period of time. In addition, cables that are snagged, pinned, or otherwise caught by the wheels, prevent free movement and quick repositioning of the equipment, as well as time spent freeing the cables, thus interrupting and inconveniencing medical staff and procedure workflow.

It is with these observations in mind, among others, that various aspects of the present disclosure were conceived and developed.

BRIEF DESCRIPTION OF THE DRAWINGS

Corresponding reference characters indicate corresponding elements among the view of the drawings. The headings used in the figures do not limit the scope of the claims.

DETAILED DESCRIPTION

Figure 1:
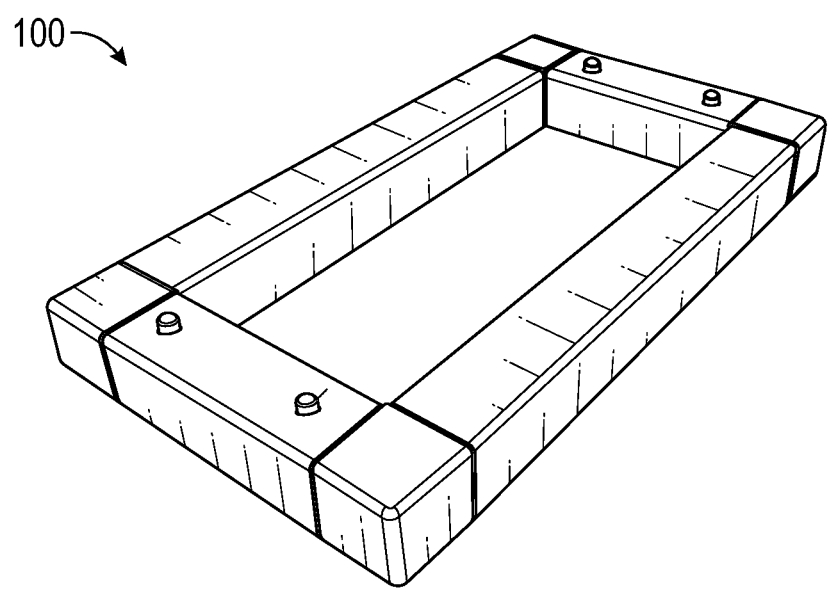
FIG. 1 is a perspective view showing a first embodiment of a wheel shield apparatus.
Figure 2:
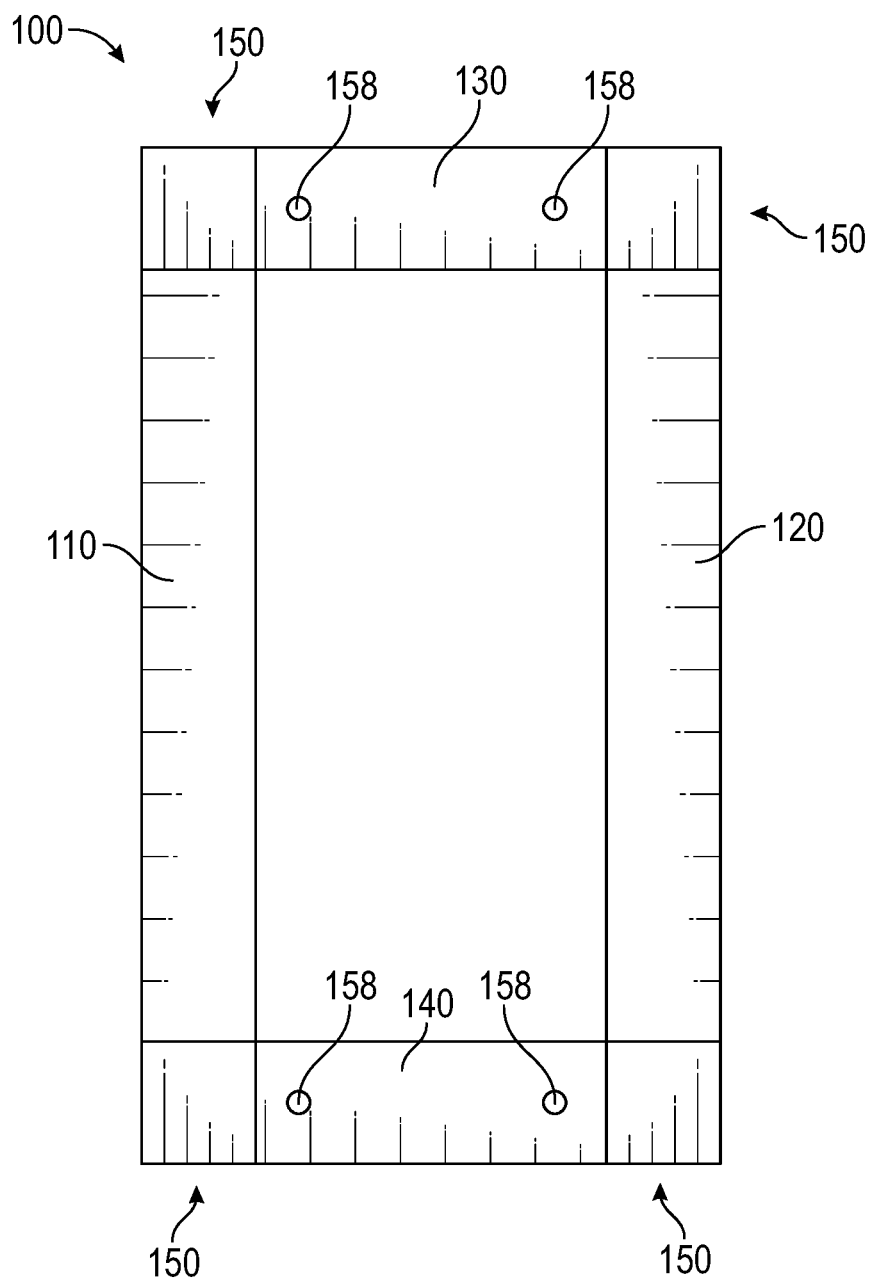
FIG. 2 is a top view showing the wheel shield apparatus of FIG. 1.
Figure 3:
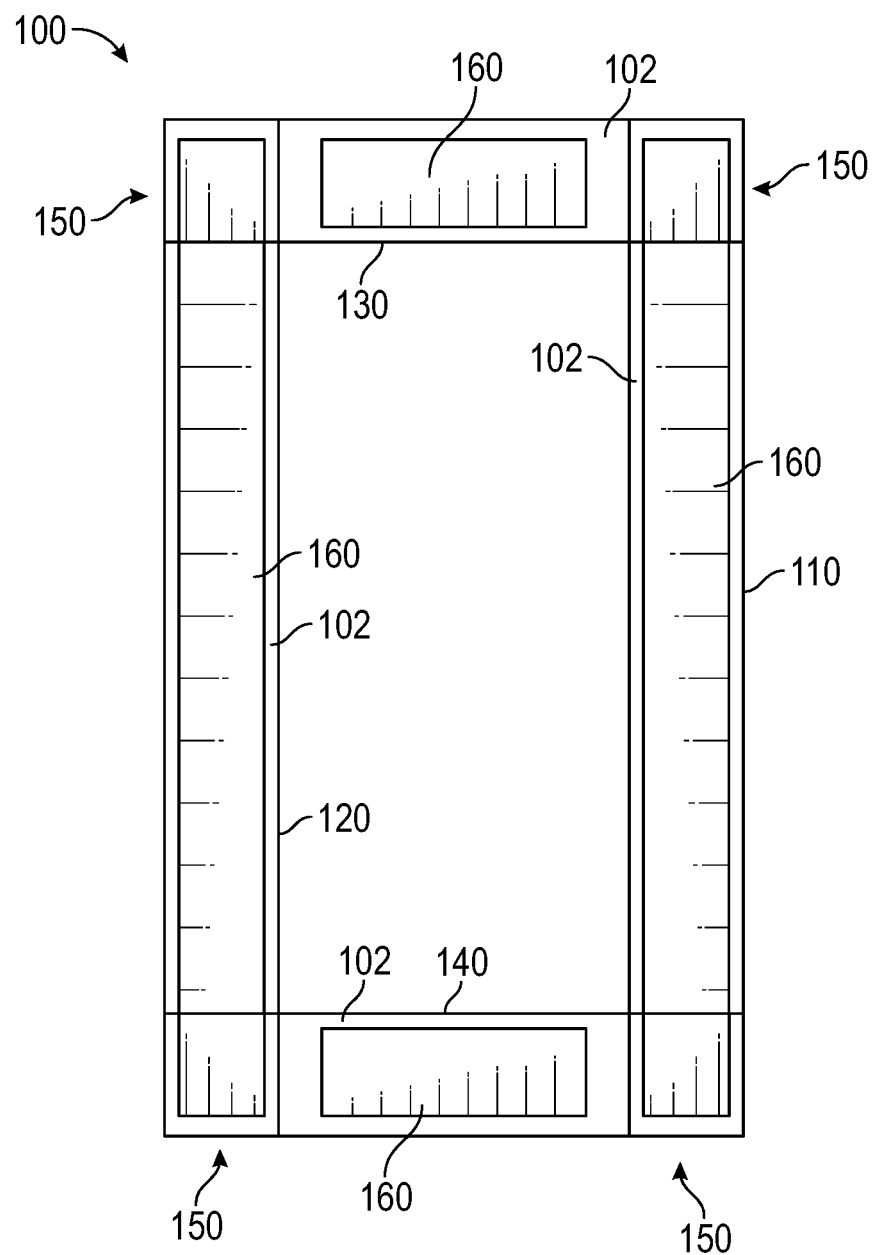
FIG. 3 is a bottom view showing the wheel shield apparatus of FIG. 1.
Figure 4:
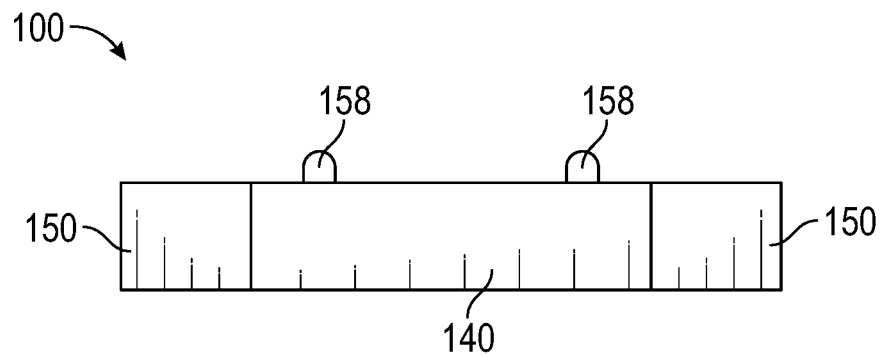
FIG. 4 is a front view showing the wheel shield apparatus of FIG. 1.

Various embodiments of a wheel shield apparatus for engagement with a neurosurgical microscope wheel or other types of heavily wheeled machinery are disclosed herein. In some embodiments, the wheel shield apparatus includes a pair of elongated parallel tube members in perpendicular engagement with a pair of short parallel tube members. In some embodiments, at least one removable side of the wheel shield apparatus is operable to be temporarily opened or removed such that the wheel shield apparatus may be placed around a wheel of a neurosurgical microscope or some other type of heavy wheeled machinery and the removable side may be placed in a closed position such that the wheel shield surrounds the wheel. In some embodiments, each of the pair of elongated parallel tube members and/or each of the pair of short parallel tube members comprises a cavity configured to receive a ballast material to provide sufficient weight to ensure that the wheel shield apparatus contacts the floor such that cables along the floor are pushed out of the way by the wheel shield apparatus and prevented from being run over while the machinery is being transported. In addition, some embodiments of the wheel shield apparatus include a material with a low coefficient of friction applied to at least a bottom surface of the wheel shield apparatus in contact with the floor such that the wheel shield apparatus is able to slide across the floor with the machinery while concurrently protecting the floor from scratches or abrasions. Referring to the drawings, embodiments of a wheel shield apparatus are illustrated and generally indicated as 100 in FIGS. 1-8, 200 in FIGS. 9-12, 300 in FIGS. 13-15, 400 in FIGS. 16-18, 500 in FIGS. 19-26 and 600 in FIG. 27-29.

Referring to FIGS. 1-8, a first embodiment of a wheel shield apparatus 100 is illustrated. As shown in FIGS. 1-4, the wheel shield apparatus 100 includes a first elongated tube member 110 and a second elongated tube member 120 in perpendicular engagement with a first short tube member 130 and a second short tube member 140. In some embodiments, the first and second elongated tube members 110 and 120 and the first and second short tube members 130 and 140 may be hollow square aluminum tubing, although other suitable materials are contemplated. The first (and second) elongated tube members 110 (120) each define a respective cavity 112 (122) that terminates in an upper open end 111 (121) and a lower open end 113 (123). Similarly, the first (and second) short tube members 130 (140) also define a respective cavity 132 (142), a respective first open end 131 (141) and a respective second open end 133 (143), however in some embodiments the first (and second) short tube members 130 (140) also include a pair of respective pin apertures 134A and 134B (144A and 144B). In one embodiment, the first elongated tube member 110, the second elongated tube member 120, the first short tube member 130 and the second short tube member 140 each define a rectangular cross section. Together, the first elongated tube member 110, the second elongated tube member 120, the first short tube member 130 and the second short tube member 140 define a generally rectangular shape.

Figure 6:
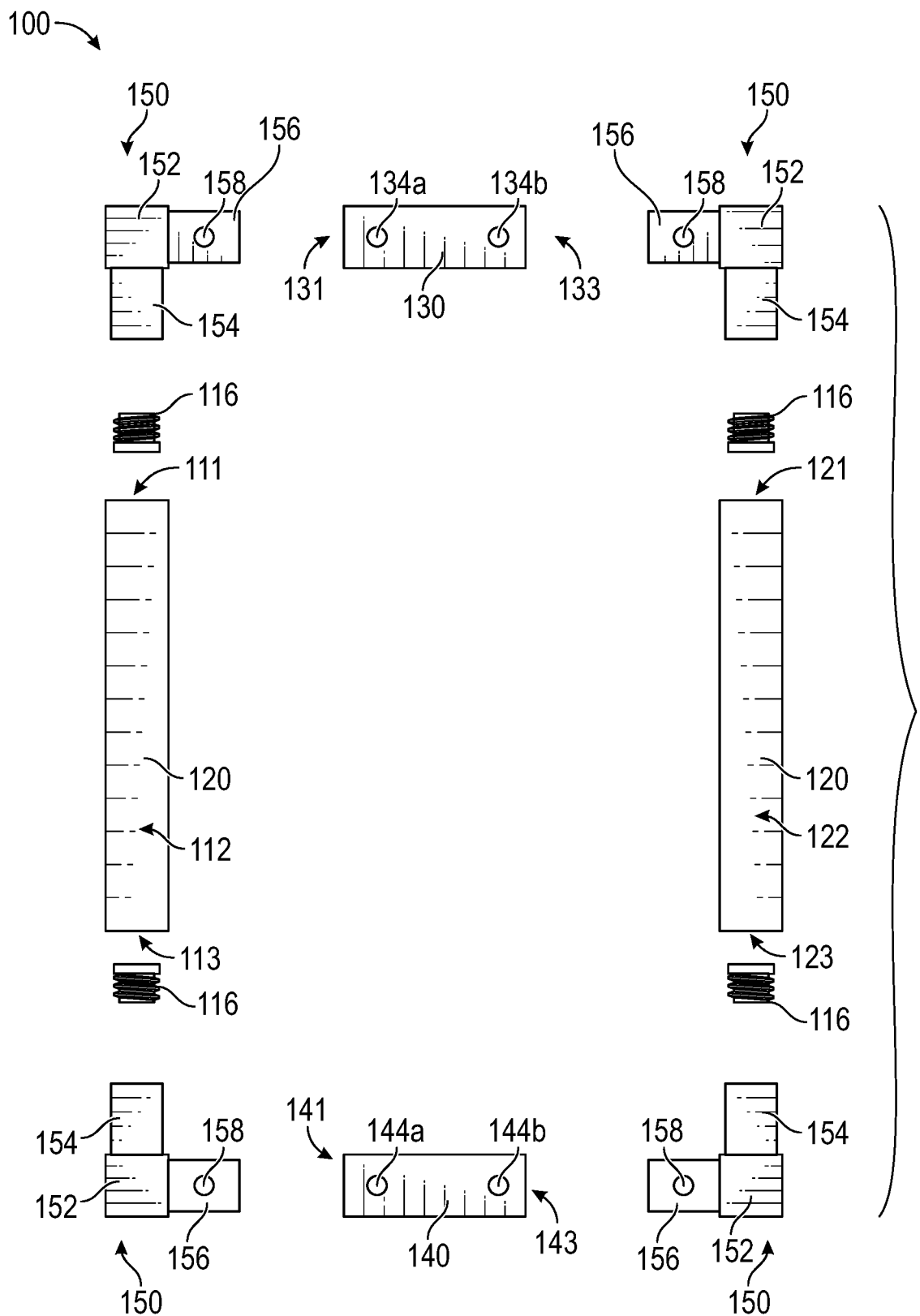
FIG. 6 is an exploded view showing the wheel shield apparatus of FIG. 1.
Figure 7:
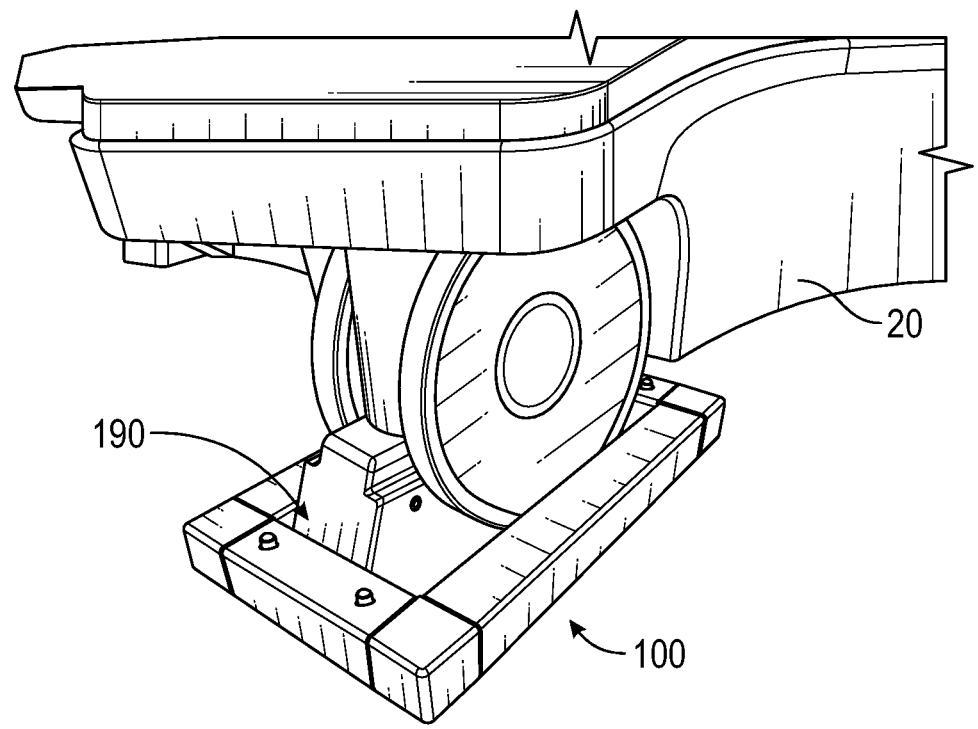
FIG. 7 is an illustration showing the wheel shield apparatus of FIG. 1 in use with a Zeiss KINEVO 900 neurosurgical microscope.

In some embodiments, the first elongated tube member 110 is in perpendicular engagement with the first short tube member 130 by a connector 150. As shown in FIG. 6, the connector 150 includes a corner block 152, a pinless extension block 154, and an extension block 156, the pinless extension block 154 and the extension block 156 collectively defining a right angle joint. The pinless extension block 154 is configured to be inserted into an upper open end 111 of the first elongated tube member 110 and the extension block 156 is configured to be inserted into a first open end 131 of the first short tube member 130. In some embodiments, the extension block 156 includes a button pin 158 for a snap-fit engagement with the pin aperture 134A of the first short tube member 130. As further shown, the connection involving the first elongated tube member 110, the connector 150 and the first short tube member 130 described are repeated for the remaining three corners such that four connectors 150 are used to interlock the first elongated tube member 110, the second elongated tube member 120, the first short tube member 130 and the second short tube member 140 in a snap-fit engagement. In some embodiments, the connectors 150 shown in FIG. 7 are manufactured by ESTO Connectors and the tubing material used for each of the elongated tube members 110 and 120 as well as each of the short tube members 130 and 140 is 1" square aluminum tubing. From end to end, the wheel shield apparatus 100 of FIG. 7 may be 9 inches in length and 5 inches in width. An available space 190 (FIGS. 7 and 8) in the center of the wheel shield apparatus 100 for receipt of the machinery wheel is 7" in length and 3" in width.

Figure 8:
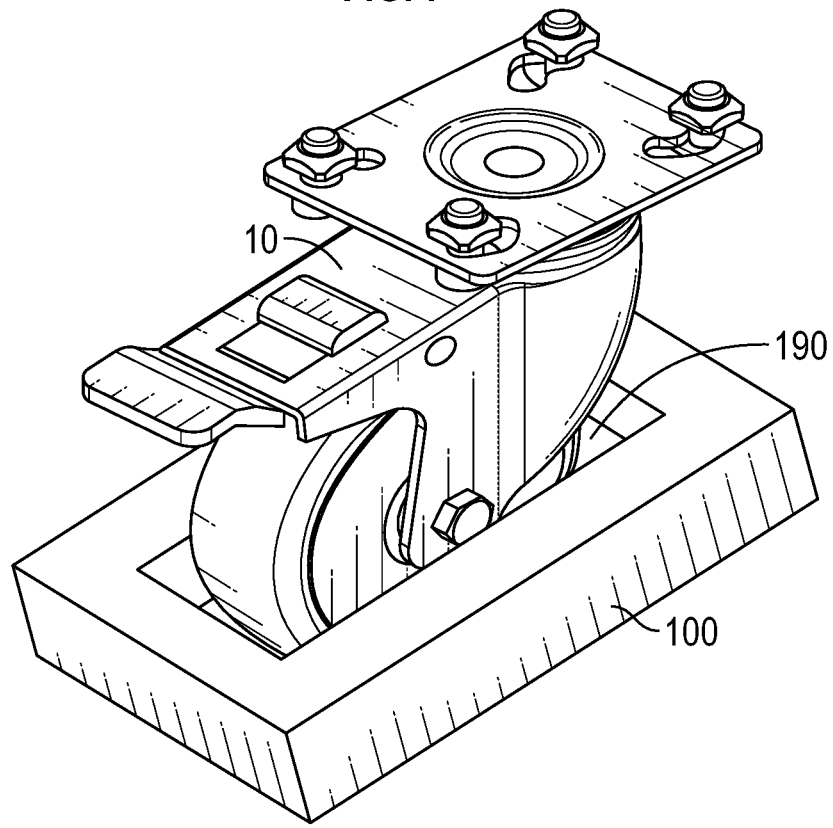
FIG. 8 is an illustration showing the wheel shield apparatus of FIG. 1 in use with a typical caster.

In some embodiments, one or both of the pair of elongated tube members 110 and/or 120 may be disengaged from the pair of short tube members 130 and 140 by pressing at least two of the button pins 158 such that each button pin 158 is pushed into the extension block 156 and the extension block 156 may be removed from the first or second open end 131 (141) or 133 (143) of each of the pair of short tube members 130 and 140, respectively. With at least one of the pair of elongated tube members 110 or 120 removed, the wheel shield apparatus 100 may be placed around a wheel of a piece of machinery, notably a neurosurgical microscope, and the elongated tube member 110 or 120 which was removed may be replaced by inserting the respective extension blocks 156 of each of the connectors 150 engaged with the elongated tube member 110 or 120 into the first or second open end 131 (141) or 133 (143) of each of the pair of respective short tube members 130 and 140, depending on which elongated tube member 110 or 120 was removed. An illustration of the wheel shield apparatus 100 placed around a wheel of a neurosurgical microscope is shown in FIG. 7. For example, the neurosurgical microscope shown is a Zeiss KINEVO 900; however, other types of heavily wheeled machinery are also contemplated, as shown in FIG. 8.

Figure 5:
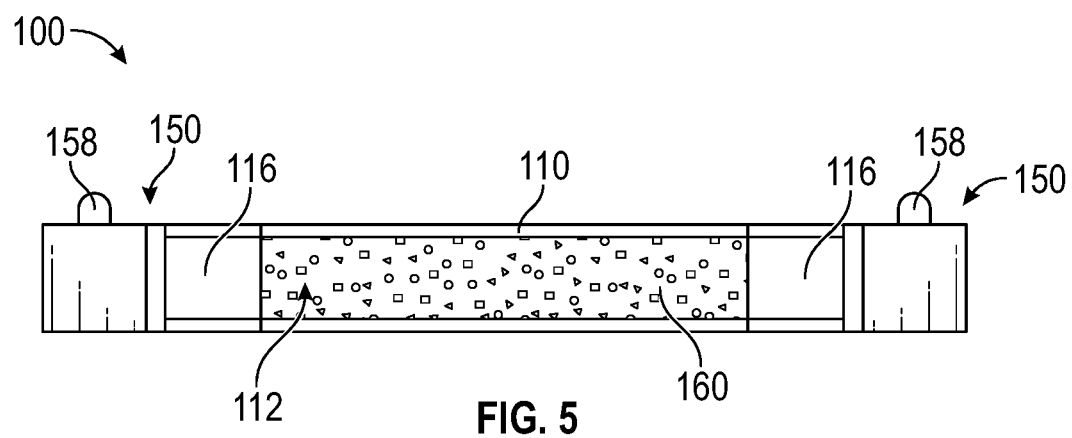
FIG. 5 is a side cross-sectional view showing the wheel shield apparatus of FIG. 1.

In some embodiments as shown in FIG. 5, each of the elongated tube members 110 and 120 include a ballast material 114 inserted into the respective cavities 112 and 122 of each of the elongated tube members 110 and 120 such that the wheel shield apparatus 100 is weighed down and kept in contact with the floor in order to gently knock cables out of the path of the machinery wheel. In some embodiments, each of the pair of elongated tube members 110 and 120 include a pair of caps 116 to prevent leakage or shifting of the ballast material 114. It should be noted that the ballast material 114 must be deliberately measured and placed within each the pair of elongated tube members 110 and 120 to provide a balanced weight to the wheel shield apparatus 100 so that the wheels of the machinery do not turn or rotate incorrectly when being transported. In some embodiments, the ballast material 114 may include sand, BBs or some other suitable ballast material 114. In the embodiment shown in FIG. 7, the ballast adds about 15.6 ounces of weight to the wheel shield apparatus 100 for a total weight of 28.4 ounces As demonstrated in FIG. 3, an underside 102 of the wheel shield apparatus 100 may in some embodiments be coated with a slidable material 160 such as Ultra High Molecular Weight Polyethylene (UHMW) tape to protect the floor and lower a coefficient of friction of the underside 102 so that the wheel shield apparatus 100 moves easily with the machinery wheel. It should be noted that the application of the slidable material 160 should not interfere with the connectivity or removal of various components of the wheel shield apparatus 100.

Figure 9:
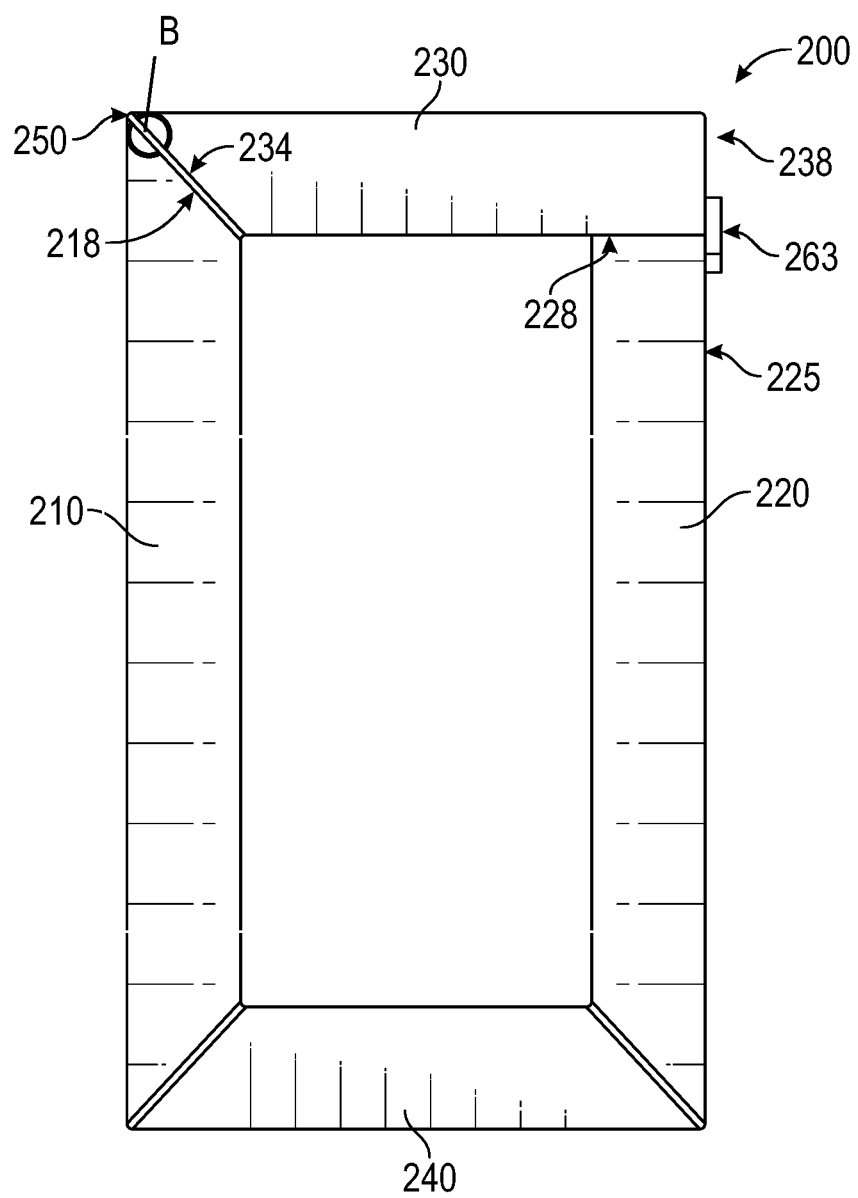
FIG. 9 is a top view showing a second embodiment of a wheel shield apparatus.
Figure 10:
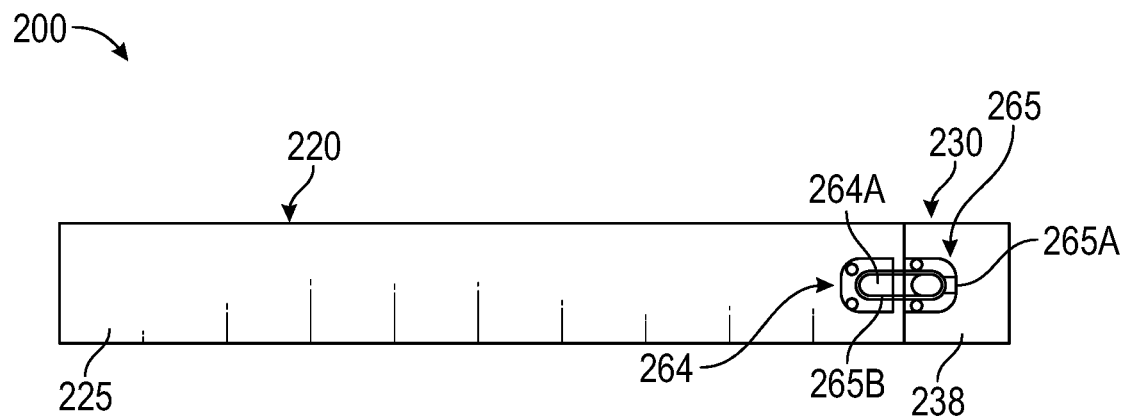
FIG. 10 is a side view showing the wheel shield apparatus of FIG. 9.
Figure 11:
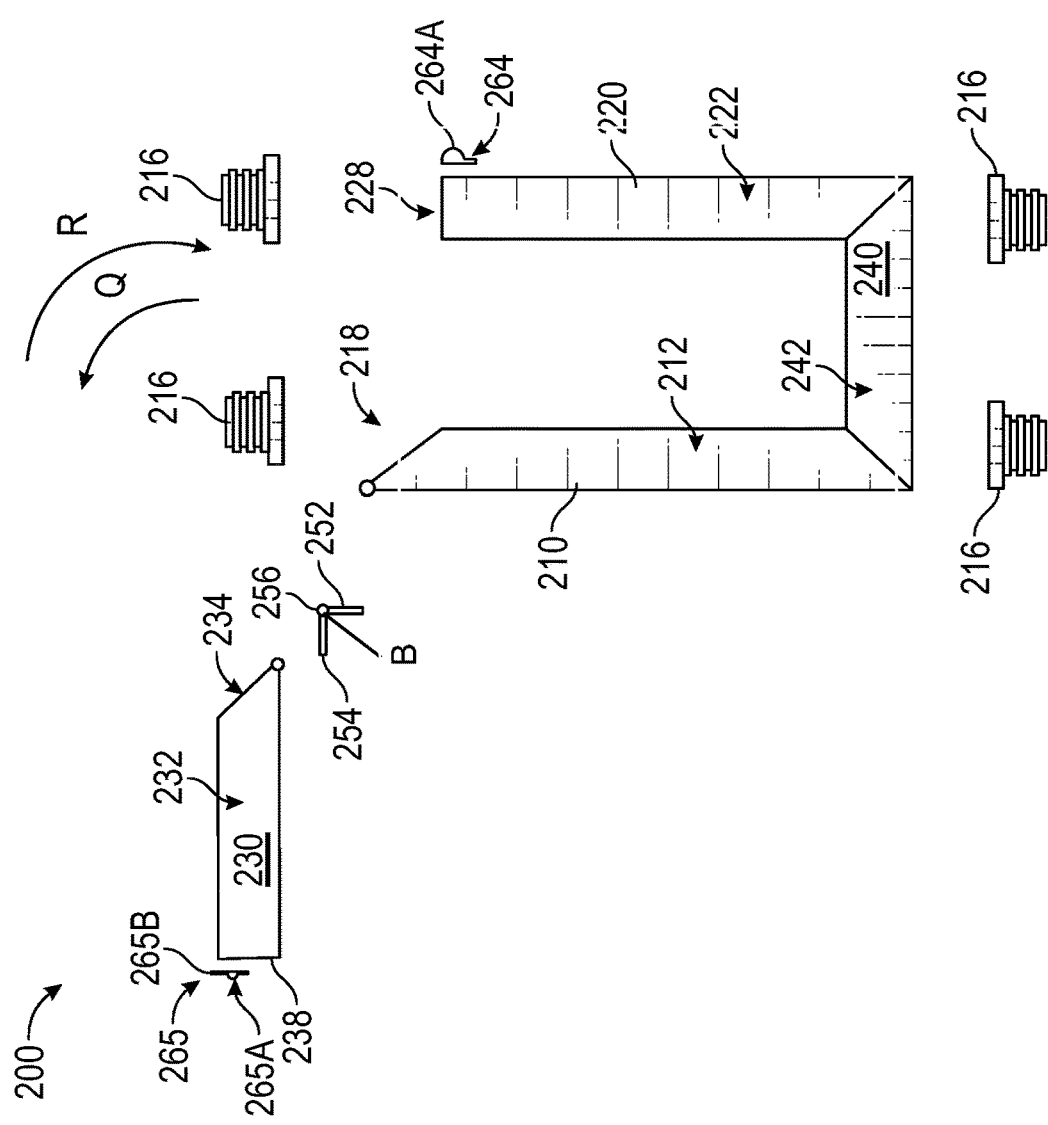
FIG. 11 is an exploded view showing the wheel shield apparatus of FIG. 9.

A second embodiment of a wheel shield apparatus 200 is shown in FIGS. 9-12. As illustrated in FIGS. 9 and 11, the wheel shield apparatus 200 includes a first elongated tube member 210 and a second elongated tube member 220 in perpendicular engagement with a first short tube member 230 and a second short tube member 240. However, unlike the first embodiment of the wheel shield apparatus 100, the first elongated tube member 210, the second elongated tube member 220 and the second short tube member 240 are integral. This integration may be achieved by welding in a manner that does not produce any sharp edges. The first elongated tube member 210 notably defines an angled edge 218 and a cavity 212, and the second elongated tube member 220 defines a flat edge 228 and a cavity 222. The second short tube member 240 also defines a cavity 242. The first short tube member 230 further defines a cavity 232, an angled edge 234 and a flat edge 238, wherein the angled edge 234 of the first short tube member 230 is configured for engagement with the angled edge 218 of the first elongated tube member 210 by a hinge 250. The hinge 250 further includes an axle 256 and a first wing 252 and a second wing 254 for respective engagement with the first elongated tube member 210 and the first short tube member 230. In this manner, the first elongated tube member 210 and the first short tube member 230 collectively form a joint with one degree of freedom. The first short tube member 230 may be rotated about a vertical axis B in a clockwise or counterclockwise direction Q about the hinge 250 to create a space for the wheel shield apparatus 200 to be placed around a machinery wheel. Once the wheel shield member 200 is placed around the wheel, the first short tube member 230 may be rotated about the hinge 250 in the opposite clockwise or counterclockwise direction R and locked in place using a latch 263. In one embodiment, the first elongated tube member 210, the second elongated tube member 220, the first short tube member 230 and the second short tube member 240 each define a rectangular cross section. Together, the first elongated tube member 210, the second elongated tube member 220, the first short tube member 230 and the second short tube member 240 define a generally rectangular shape.

As shown in FIG. 10, the latch 263 comprises a latch base 264 engaged with an outer side 225 of the second elongated tube member 220 and a latch loop 265 engaged with the flat edge 238 of the first short tube member 230. The latch 263 may be locked by placing the loop portion 265A of the latch loop 265 around a latch base extension 264A and pushing a latch lever 265B down such that the loop portion 265A tightens around the latch base extension 264A. Conversely, the latch may be unlocked by lifting the latch lever 265B such that the loop portion 265A loosens and may be lifted away from around the latch base extension 264A.

Figure 12:
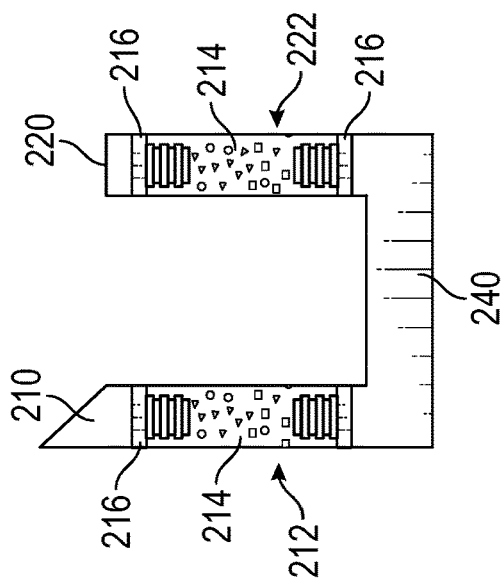
FIG. 12 is a top cross-section view showing the wheel shield apparatus of FIG. 9 with the first short tube removed.

In some embodiments shown in FIGS. 11-12, each of the elongated tube members 210 and 220 include a ballast material 214 inserted into the respective cavities 212 and 222 of each of the elongated tube members 210 and 220 such that the wheel shield apparatus 200 is weighed down and kept in contact with the floor in order to gently knock cables out of the path of the machinery wheel. In some embodiments, each of the pair of elongated tube members 210 and 220 include a pair of caps 216 to prevent leakage or shifting of the ballast material 214. It should be noted that the ballast material 214 must be deliberately measured and placed within each the pair of elongated tube members 210 and 220 to provide a balanced weight to the wheel shield apparatus 200 so that the wheels of the machinery do not turn or rotate incorrectly when being transported. In some embodiments, the ballast material 214 may comprise sand or BBs or some other suitable ballast material 214. Much like the embodiment of the wheel shield apparatus 100 shown in FIG. 3, an underside (not shown) of the wheel shield apparatus 200 may in some embodiments be coated with a slidable material (not shown) such as UHMW tape to protect the floor and lower a coefficient of friction of the underside so that the wheel shield apparatus 200 moves easily with the machinery wheel. It should be noted that the application of the slidable material should not interfere with the connectivity or removal of various components of the wheel shield apparatus 200.

Figure 13:
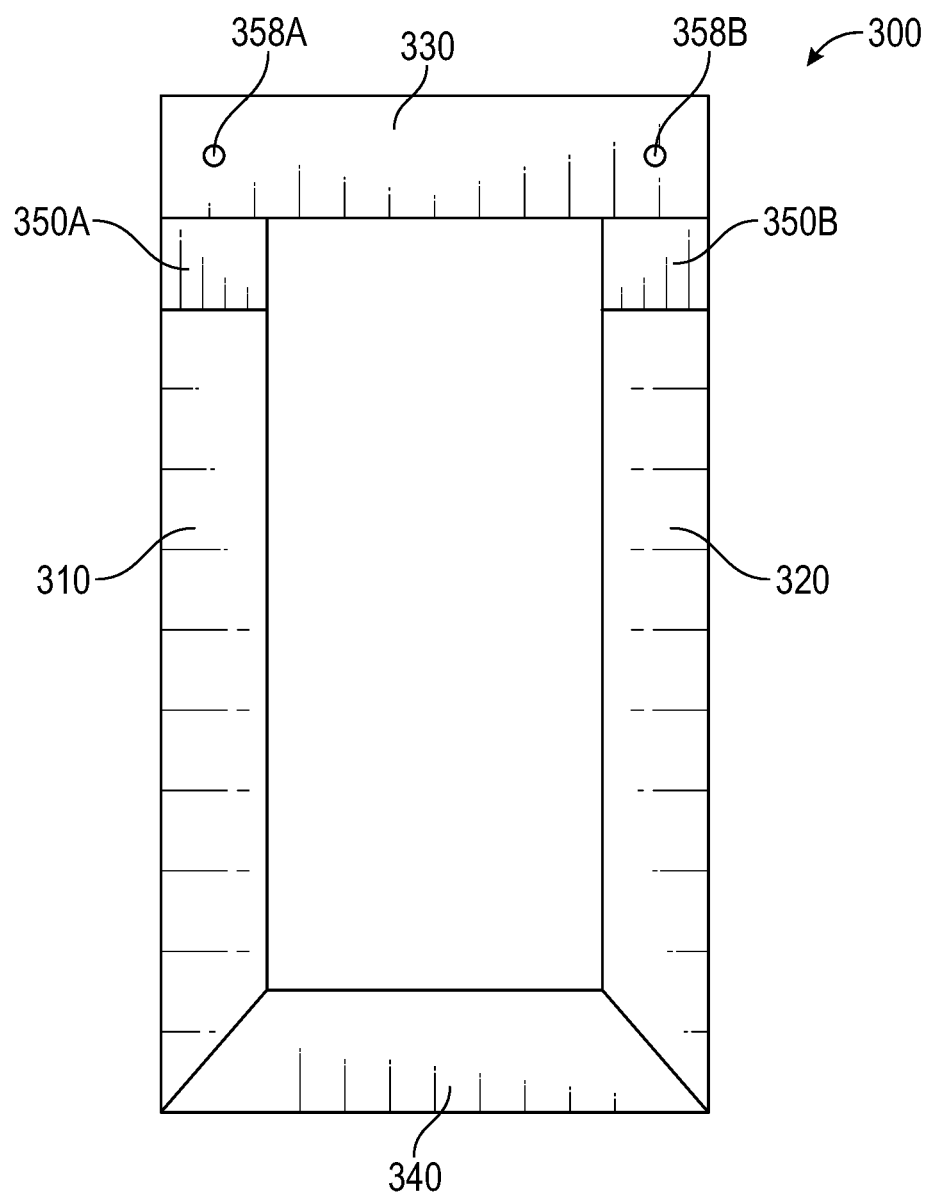
FIG. 13 is a top view of a third embodiment showing a wheel shield apparatus.
Figure 14:
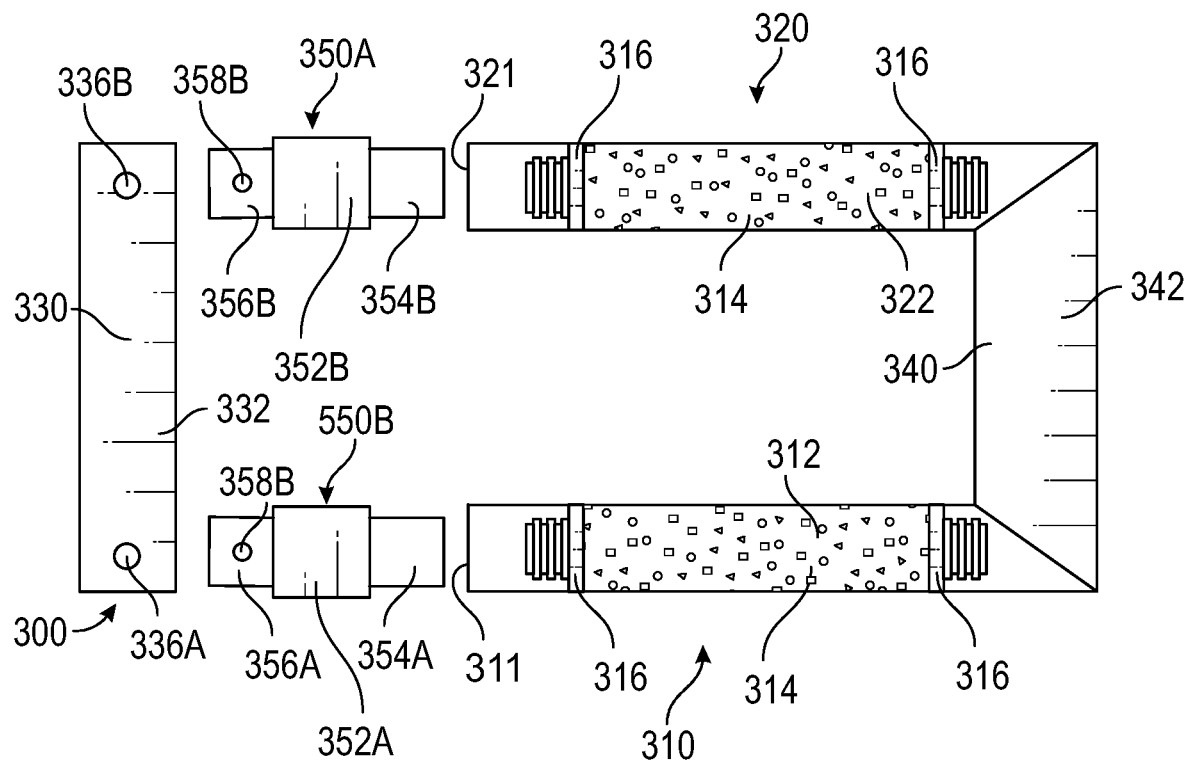
FIG. 14 is an exploded view showing the wheel shield apparatus of FIG. 13.
Figure 15:
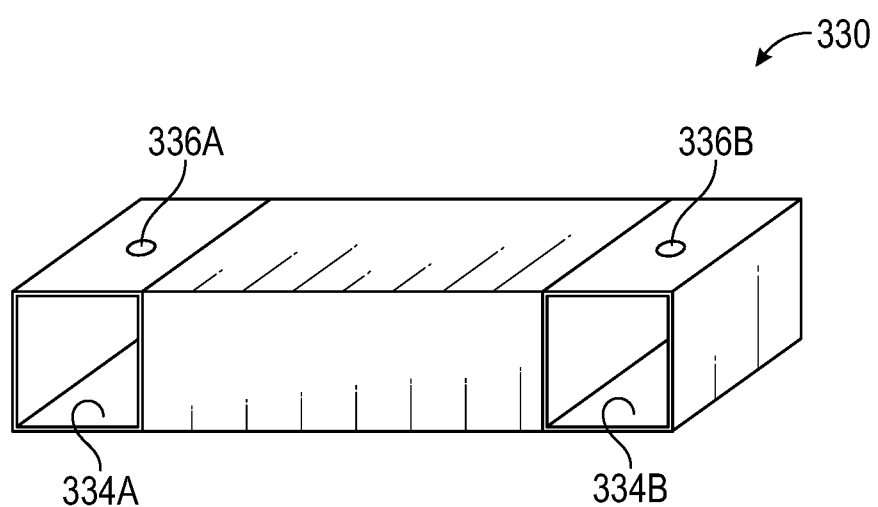
FIG. 15 is a perspective view showing a first short tube of the wheel shield apparatus of FIG. 13.

A third embodiment of the wheel shield apparatus 300 is shown in FIGS. 13-15. The wheel shield apparatus 300 includes a first elongated tube member 310 and a second elongated tube member 320 in perpendicular engagement with a first short tube member 330 and a second short tube member 340. However, unlike the first embodiment of the wheel shield apparatus 100, the first elongated tube member 310, the second elongated tube member 320 and the second short tube member 340 are integral. As described above, this integration may be achieved by welding that produces no sharp edges. The first and second elongated tube members 310 and 320 both include respective open ends 311 and 321 and respective cavities 312 and 322. In some embodiments, the first and second short tube members 330 and 340 further define respective cavities 332 and 342. The first short tube member 330 is shown in FIG. 15 including a first connector aperture 334A in communication with a first pin aperture 336A and a second connector aperture 334B in communication with a second pin aperture 336B. FIG. 14 illustrates the wheel shield apparatus 300 further including a pair of connectors 350A and 350B. Each of the pair of connectors 350A and 350B includes a block 352, a pinless extension block 354 extending from one end of the block 352 and an extension block 356 extending from an opposite end of the block 352. In some embodiments, each extension block 356 includes a button pin 358 for engagement with either the first pin aperture 336A or the second pin aperture 336B of the first short tube member 330. In one embodiment, the first elongated tube member 310, the second elongated tube member 320, the first short tube member 330 and the second short tube member 340 each define a rectangular cross section. Together, the first elongated tube member 310, the second elongated tube member 320, the first short tube member 330 and the second short tube member 340 define a generally rectangular shape.

In some embodiments, the first short tube member 330 may be disengaged from the pair of elongated tube members 310 and 320 by pressing the pair of button pins 358A and 358B such that each button pin 358 is pushed into their respective extension block 356A or 356B and the extension blocks 356A and 356B may be disengaged from the connecter apertures 334A and 334B and the first short tube member 330 may be removed. With the first short tube member 330 removed, the wheel shield apparatus 300 may be placed around a wheel of a piece of machinery, notably a neurosurgical microscope, and the first short tube member 330 which was removed may be replaced by inserting the extension blocks 356A and 356B of each of the connectors 350A and 350B engaged with the elongated tube member 310 or 320 into the respective connector apertures 334A and 334B of the first short tube members 330.

In the embodiments shown in FIG. 14, each of the elongated tube members 310 and 320 include a ballast material 314 inserted into the respective cavities 312 and 322 of each of the elongated tube members 310 and 320 such that the wheel shield apparatus 300 is weighed down and kept in contact with the floor in order to gently knock cables out of the path of the machinery wheel. In some embodiments, each of the pair of elongated tube members 310 and 320 include a pair of caps 316 to prevent leakage or shifting of the ballast material 314. It should be noted that the ballast material 314 must be deliberately measured and placed within each the pair of elongated tube members 310 and 320 to provide a balanced weight to the wheel shield apparatus 300 so that the wheels of the machinery do not turn or rotate incorrectly when being transported. In some embodiments, the ballast material 314 may comprise sand or BBs or some other suitable ballast material 314. Much like the embodiment of the wheel shied apparatus 100 shown in FIG. 3, an underside (not shown) of the wheel shield apparatus 300 may in some embodiments be coated with a slidable material (not shown) such as UHMW tape to protect the floor and lower a coefficient of friction of the underside so that the wheel shield apparatus 300 moves easily with the machinery wheel. It should be noted that the application of the slidable material should not interfere with the connectivity or removal of various components of the wheel shield apparatus 300.

Figure 16:
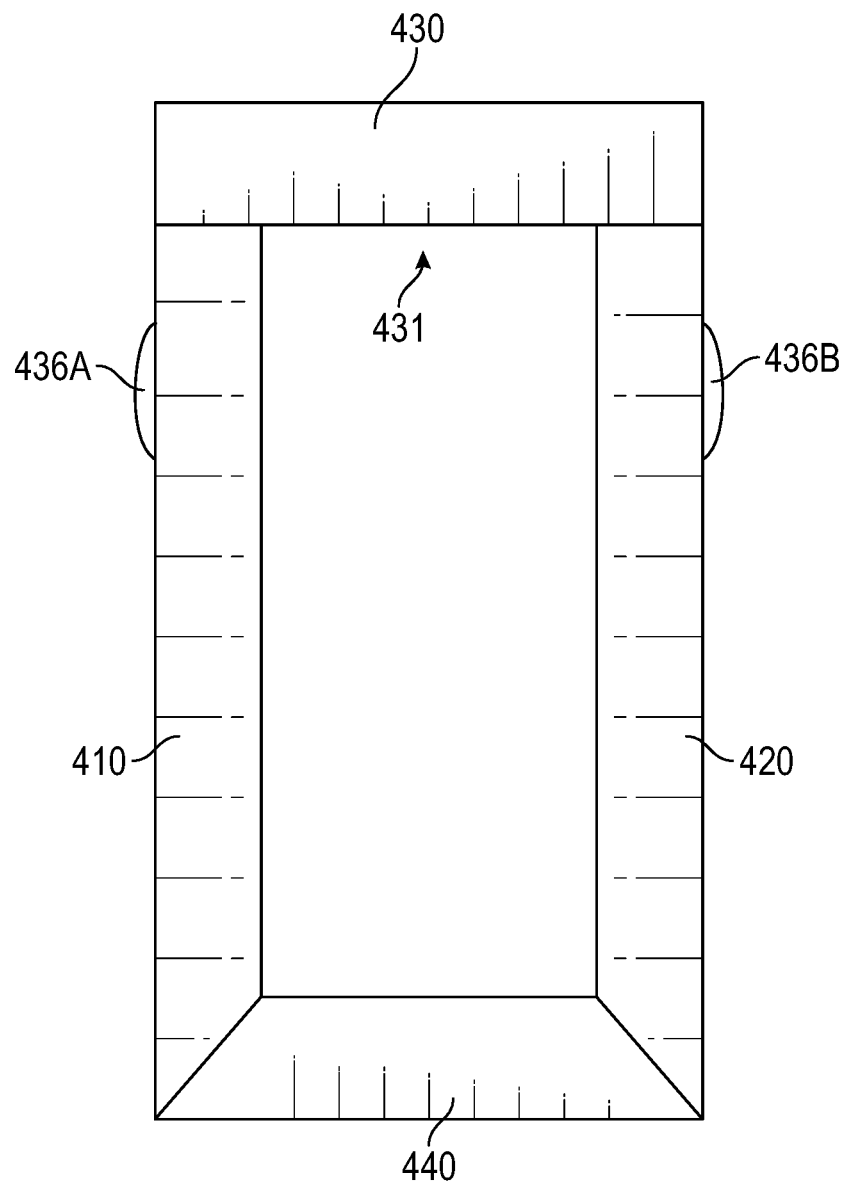
FIG. 16 is a top view showing a fourth embodiment of a wheel shield apparatus.
Figure 17:
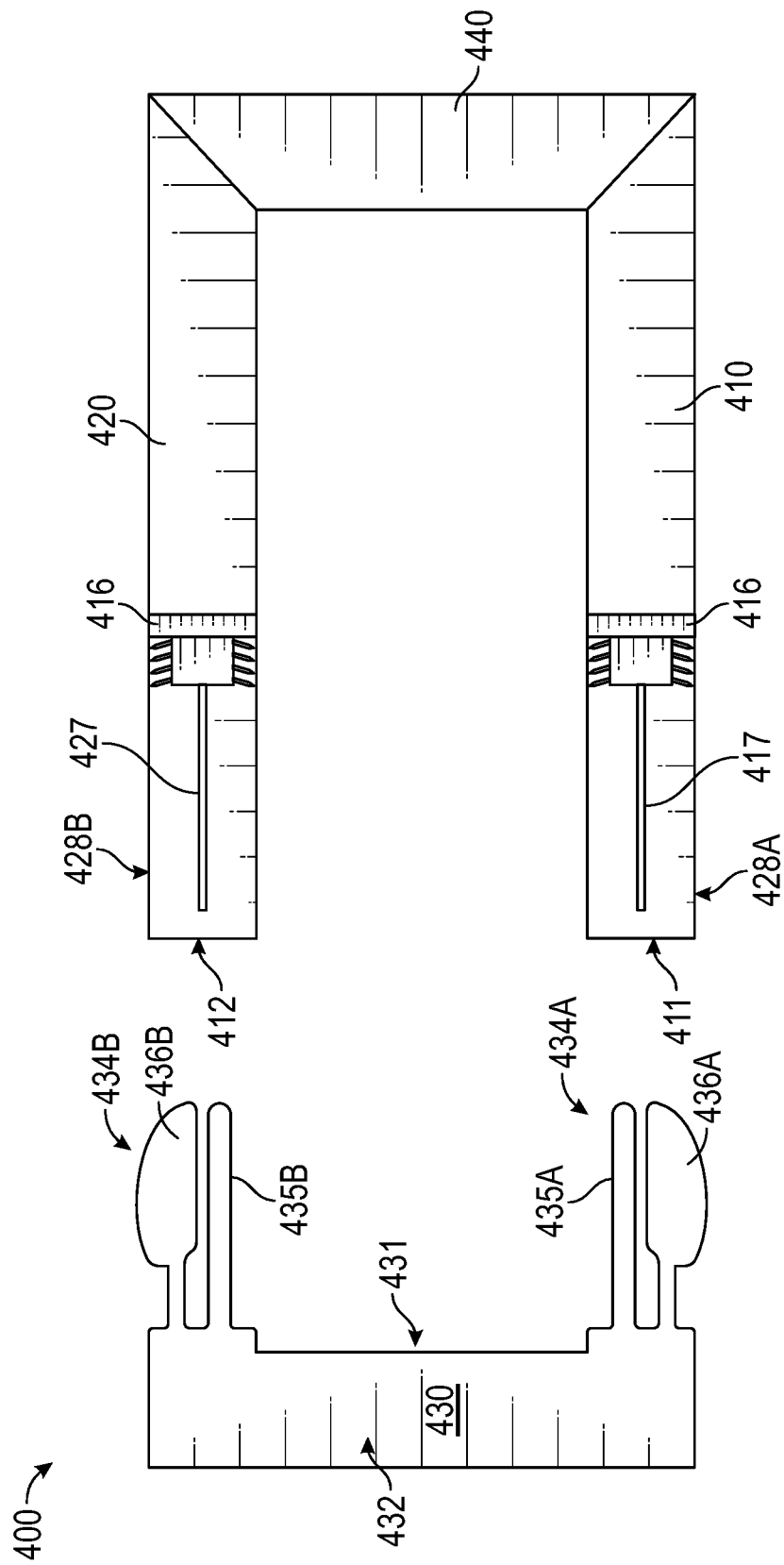
FIG. 17 is a top exploded view showing the wheel shield apparatus of FIG. 16.
Figure 18:
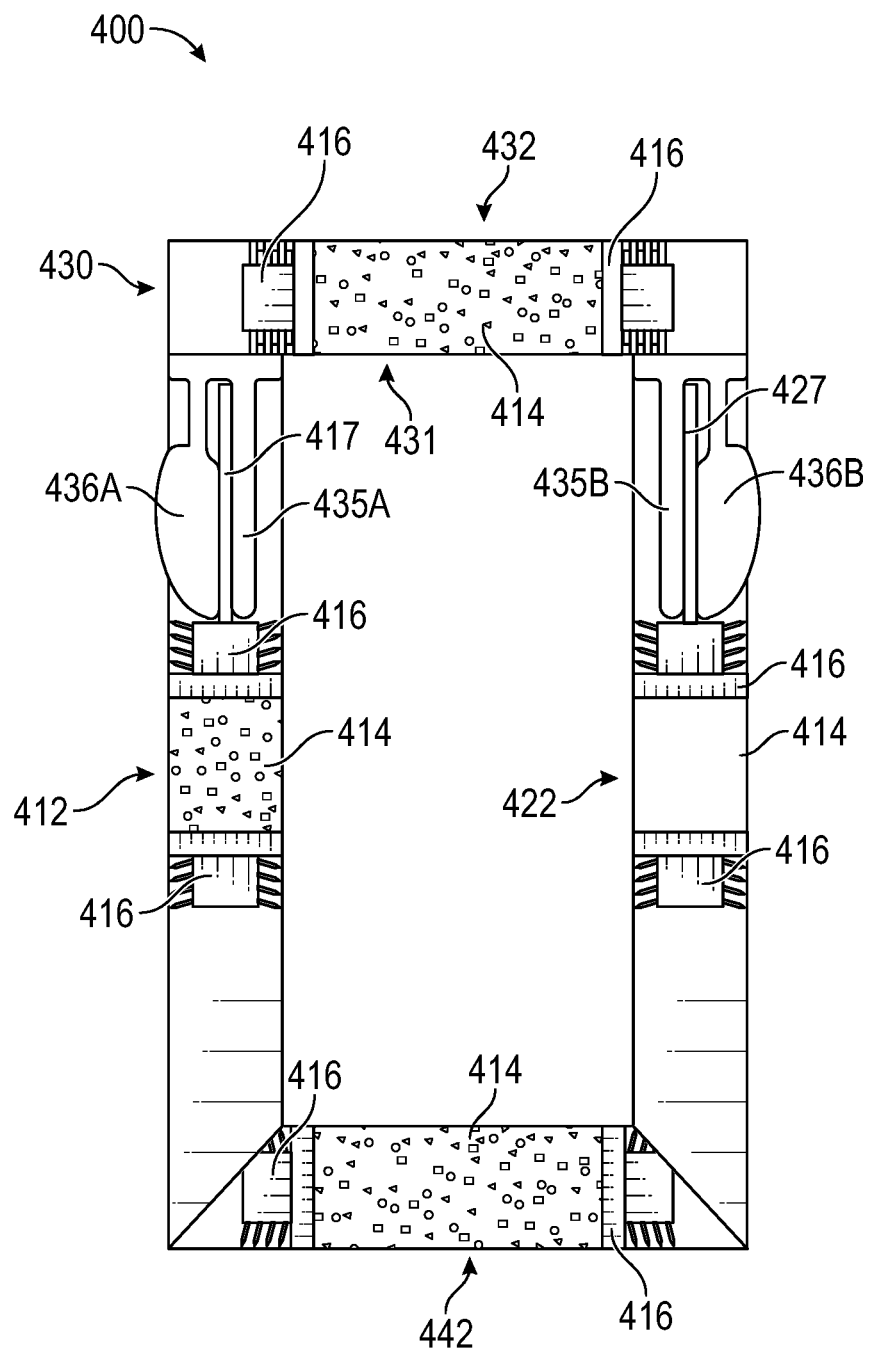
FIG. 18 is a top cross-sectional view showing the wheel shield apparatus of FIG. 16.

A fourth embodiment of the wheel shield apparatus 400 is illustrated in FIGS. 16-18. The wheel shield apparatus 400 includes a first elongated tube member 410 and a second elongated tube member 420 in perpendicular engagement with a first short tube member 430 and a second short tube member 440. However, unlike the first embodiment of the wheel shied apparatus 100, the first elongated tube 410, the second elongated tube member 420 and the second short tube member 440 are integral. This may be achieved by welding that produces no sharp edges. The first and second elongated tube members 410 and 420 both define respective open ends 411 and 421 and respective cavities 412 and 422. Each respective open end 411 and 421 includes a clip guide 427A and 427B. In addition, the first and second elongated tube members 410 and 420 both include a clip aperture 418A and 418B as shown in FIGS. 16-18. In some embodiments, the first and second short tube members 430 and 440 further define respective cavities 432 and 442. In one embodiment, the first elongated tube member 410, the second elongated tube member 420, the first short tube member 430 and the second short tube member 340 each define a rectangular cross section. Together, the first elongated tube 410, the second elongated tube 420, the first short tube 430 and the second short tube 440 collectively define a generally rectangular shape.

The wheel shield apparatus 400 further includes a pair of mirrored clips 434A and 434B extending from an inner face 431 of the first short tube member 430. Each of the clips 434A and 434B includes a guide prong 435A and 435B and a pinch prong 436A and 436B where the pinch prongs 436A and 436B are each located lateral to their respective guide prongs 435A and 435B. The clips 434A and 434B are configured for respective engagement within the open ends 411 and 421 of the first and second elongated tube members 410 and 420. In this particular embodiment, the first short tube member 430 may be engaged with the pair of elongated tube members 410 and 420 by inserting the clips 434A and 434B into the open ends 411 and 421 of the first and second elongated tube members 410 and 420 such that the pinch prongs 436A and 436B flex inward until they are snapped into engagement within the respective clip apertures 418A and 418B. The clip guides 427A and 427B and guide prongs 435A and 435B are included to ensure secure engagement within the open ends 411 and 421 of the first and second elongated tube members 410 and 420. Conversely, the removal of the first short tube member 430 is achieved by simultaneously pinching the pinch prongs 436A and 436B and pulling the clips 434A and 434B of the first short tube member 430 out of the open ends 411 and 421 of the first and second elongated tube members 410 and 420.

In the embodiments shown in FIG. 18, each of the elongated tube members 410 and 420 and each of the short tube members 430 and 440 include a ballast material 414 disposed within the cavities 412, 422, 432, and 442 of each of the elongated tube members 410 and 420 and each of the short tube members 430 and 440 such that the wheel shield apparatus 400 is weighed down and kept in contact with the floor in order to gently knock cables out of the path of the machinery wheel. In some embodiments, each of the pair of elongated tube members 410 and 420 and each of the pair of short tube members 430 and 440 include a pair of caps 416 to prevent leakage or shifting of the ballast material 414. It should be noted that the ballast material 414 must be deliberately measured and placed within each the pair of elongated tube members 410 and 420 and each of the short tube members 430 and 440 to provide a balanced weight to the wheel shield apparatus 400 so that the wheels of the machinery disposed within the containment of the wheel shield apparatus 400 do not turn or rotate incorrectly when being transported. In some embodiments, the ballast material 414 may comprise sand or BBs or some other suitable ballast material 414. Similar to the embodiment of the wheel shield apparatus 100 shown in FIG. 3, an underside (not shown) of the wheel shield apparatus 400 may in some embodiments be coated with a slidable material (not shown) such as UHMW tape to protect the floor and lower a coefficient of friction of the underside so that the wheel shield apparatus 400 moves easily with the machinery wheel. It should be noted that the application of the slidable material should not interfere with the connectivity or removal of various components of the wheel shield apparatus 400.

Figure 19:
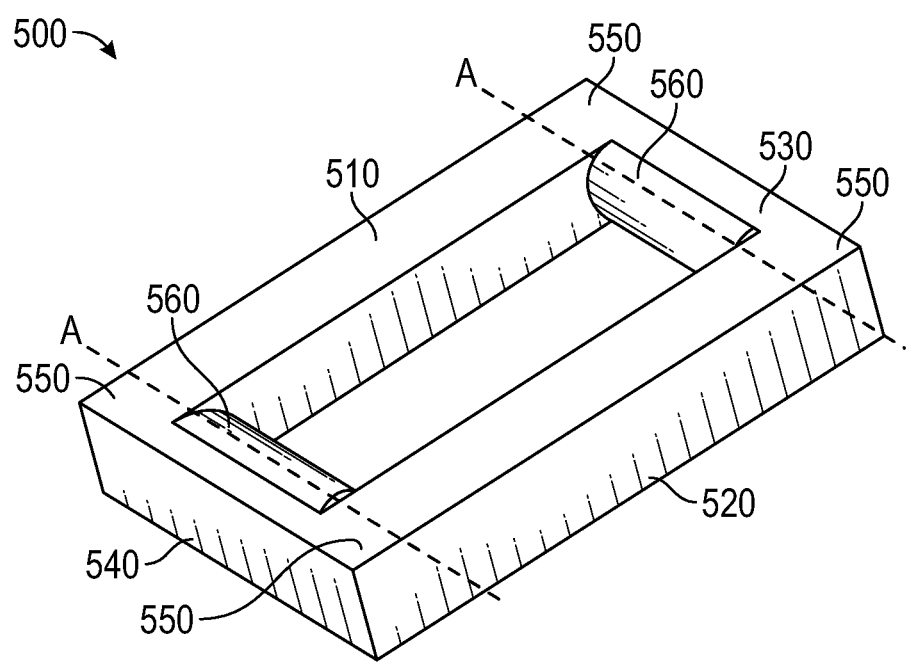
FIG. 19 is a perspective view showing a fifth embodiment of a wheel shield apparatus including a pair of rollers.
Figure 20:
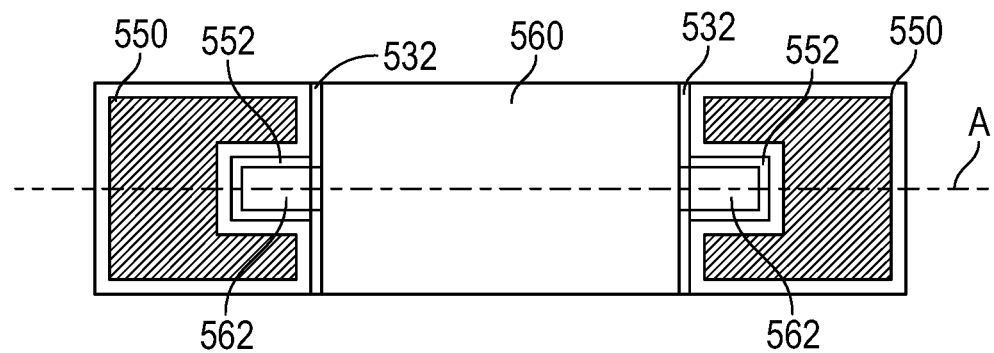
FIG. 20 is a cutaway view showing a roller housing of the wheel shield apparatus of FIG. 19 including a roller of the pair of rollers.
Figure 21:
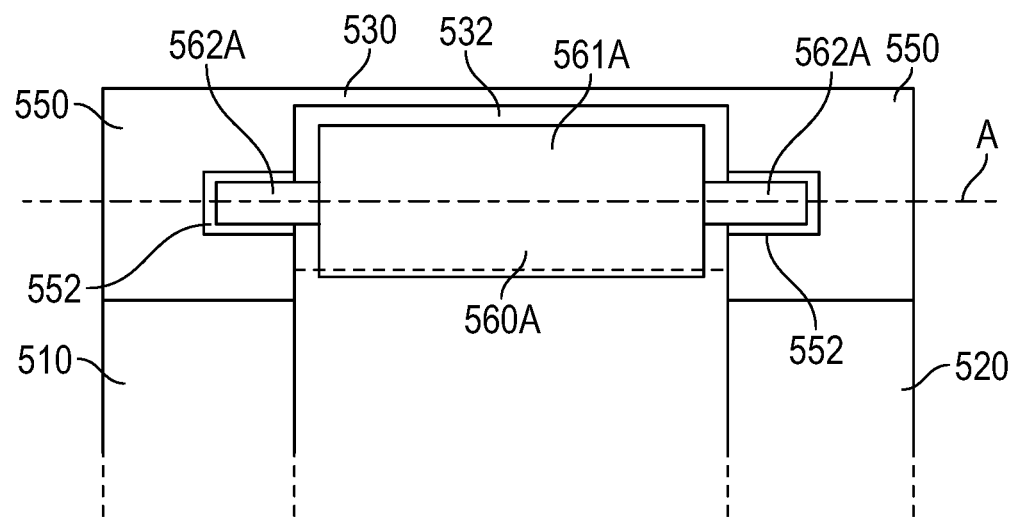
FIG. 21 is a top cross-sectional view showing the roller of FIG. 20 seated within the roller housing.

Referring to FIGS. 19-26, a fifth embodiment of a wheel shield apparatus 500 is illustrated. Wheel shield apparatus 500 can include aspects of previous embodiments in addition to a pair of rollers 560 configured for free rotation about a horizontal axis A to allow a caster to roll on the floor and against the rollers 560 while reducing friction between the wheel shield 500 and the caster. As illustrated in FIG. 19, wheel shield apparatus 500 includes a first elongated tube member 510 and a second elongated tube member 520 in perpendicular engagement with a first short tube member 530 and a second short tube member 540, first and second short tube members 530 and 540 each housing a respective roller 560 of the pair of rollers 560. FIGS. 19-21 in particular illustrate a plurality of corners 550 of the wheel shield apparatus 500, each corner 550 of the plurality of corners 550 defining a respective junction between one of the elongated tube members 510 (or 520) and a respective short tube member 530 (or 540). Each of the plurality of corners 550 is configured to receive a respective axle 562 of a roller 560 of the pair of rollers 560.

Referring to FIGS. 20 and 21, as discussed above, each roller 560 of the pair of rollers 560 is respectively associated with the first short tube member 530 or the second short tube member 540. First and second short tube members 530 and 540 can each include a respective roller housing 532 of a pair of roller housings 532 for receipt of the respective roller 560. For simplicity, only roller housing 532 of short tube member 530 is illustrated; however, it should be noted that short tube member 540 also includes a roller housing (not shown) and is similarly outfitted to receive a roller 560 of the pair of rollers 560. Roller housing 532 defines a hollow portion configured to receive a roller 560 of the pair of rollers 560. Each roller housing 532 communicates with a pair of axle receptacles 552, each axle receptacle 552 being associated with a respective corner 550 of the wheel shield 500 and being configured to receive a respective axle 562 of roller 560. Such an arrangement of roller 560, roller housing 532, and axle receptacles 562 is illustrated in FIGS. 20 and 21.

Figure 22:
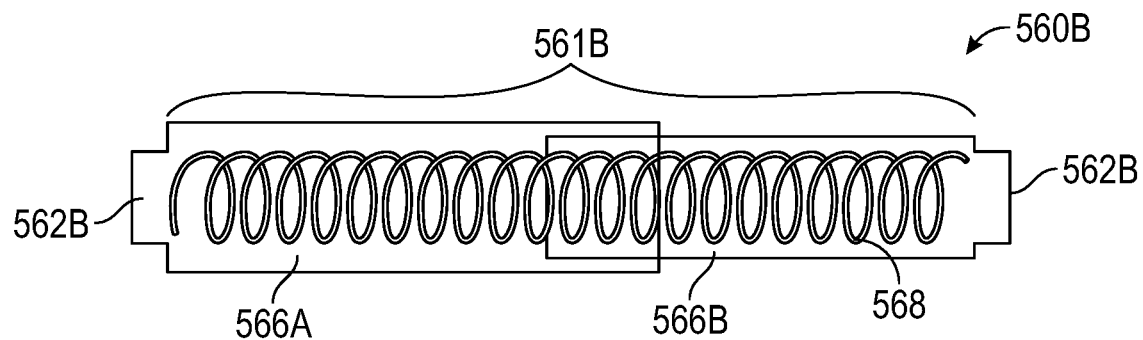
FIG. 22 is a side view showing one embodiment of a roller of the wheel shield apparatus of FIG. 19 having a tensioning element shown in phantom.
Figure 23:
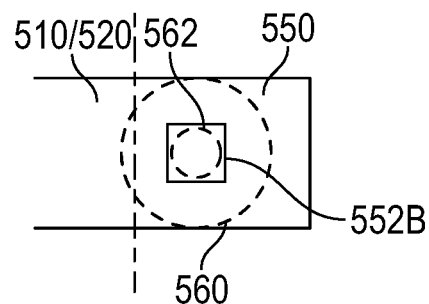
FIG. 23 is a side view showing a first embodiment of axle receptacle of the wheel shield apparatus of FIG. 19.
Figure 24:
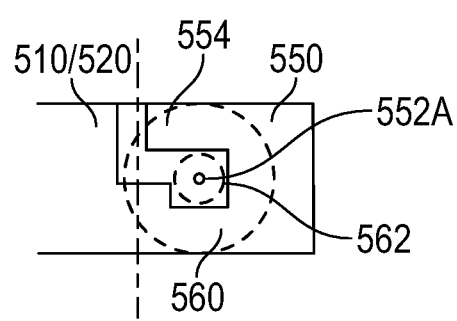
FIG. 24 is a side view showing a second embodiment of an axle receptacle of the wheel shield apparatus of FIG. 19.

FIGS. 23 and 24 illustrate respective embodiments of axle receptacles 552A and 552B configured to receive an axle 562 of roller 560. As illustrated, each axle receptacle 552 of the plurality of axle receptacles 522 is defined within a respective corner 550 of the plurality of corners 550. In particular, for each roller 560, two axle receptacles 552 are defined in communication with each respective roller housing 532. In the embodiment of FIG. 24, each corner 550 can include a track portion 554 terminating in the axle receptacle 552 for receipt of a respective axle 562 of the roller 560. The track allows axles 562 to be inserted into the receptacle 552, which can be used with a "solid' roller 560A of FIG. 21. In the embodiment of FIG. 23, each axle receptacle 552 can be trackless, as illustrated. The trackless axle receptacle 552 of FIG. 23 can be used with a "telescoping" roller 560B of FIG. 22 which allows temporary reduction of the overall length of the roller 560 for insertion into the roller housing 532 for engagement with axle receptacles 552.

Two embodiments of roller 560 are shown in FIGS. 21 and 22. Generally, roller 560 includes a roller body 561 and a pair of axles 562 defined on either side of roller body 561 and aligned along axis A. In one particular embodiment, a roller 560A including roller body 561A is a solid piece and may be rotatably associated with axles 562A. In some embodiments, the pair of axles 562A can embody a single solid rod (not shown) impaling the roller body 561A and defining a first end and a second end, the first end defining one axle 562A of the pair of axles 562A and the second end defining the other axle 562A of the pair of axles 562A. In other embodiments, axles 562A can be integral to the roller body 561A.

Alternatively, as illustrated in the embodiment of FIG. 22, roller 560B can be of a telescoping configuration and can include an outer sheath 566A in association with an inner sheath 566B, outer sheath 566A and inner sheath 566B each defining a respective axle 562B of a pair of axles 562B and collectively defining roller body 561. Collectively, outer sheath 566A and inner sheath 566B encapsulate a tensioning element 568. In the embodiment of FIG. 22, roller 560B can be inserted into axle receptacles 552 by "pinching" the outer sheath 566A and inner sheath 566B together such that the tensioning element 568 collapses and an overall length of the roller 560 is reduced, allowing insertion of the roller 560 into axle receptacles 552. After placement into axle receptacles 552, the tensioning element 568 de-tensions and the outer sheath 566A and inner sheath 566B are pushed apart such that each axle 562 of the roller 560 is secured within a respective axle receptacle 552 of the plurality of axle receptacles 552. In some embodiments, roller 560 can be appropriately weighted to additionally function as ballast.

Figure 25:
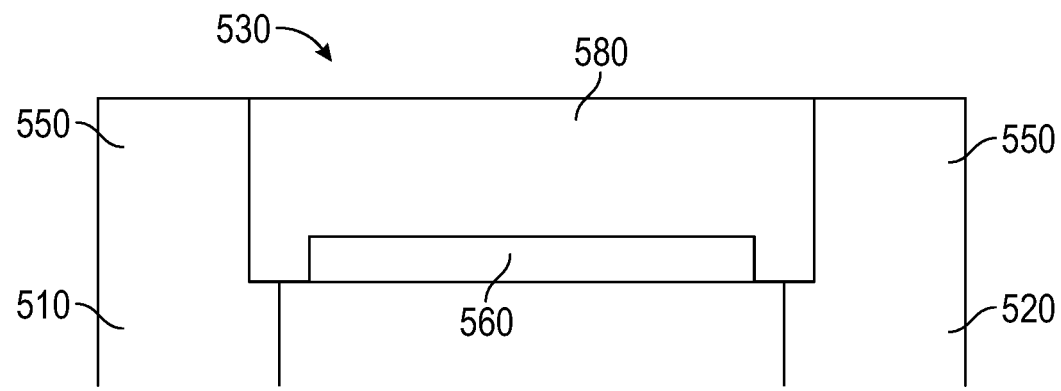
FIG. 25 is a top view showing a cover for use with one embodiment of the wheel shield apparatus of FIG. 19.
Figure 26:
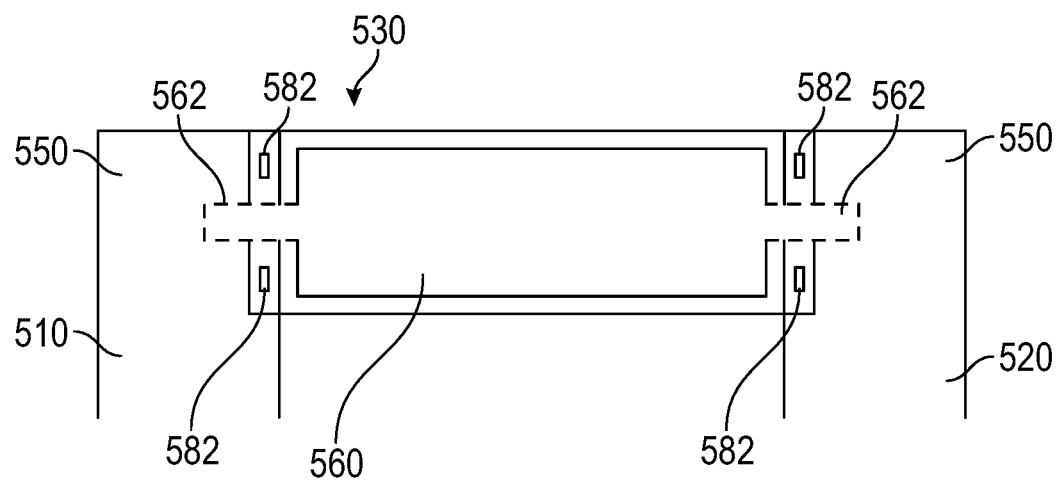
FIG. 26 is a top cutaway view showing a cover engagement point for use with one embodiment of the wheel shield apparatus of FIG. 19.

Referring to FIGS. 25 and 26, the wheel shield apparatus 500 includes a pair of covers 580, each configured for engagement with a respective short tube member 530 and 540 of the wheel shield apparatus 500 to secure rollers 560 inside their respective roller housings 532. Each cover 580 can include one or more cover engagement points 582 configured to engage the cover 580 to a respective corner 550 of the wheel shield apparatus 500. In some embodiment, each of the elongated tube members 510 and 520 include a ballast material (not shown, but analogous to ballast material 114 of FIG. 5) inserted into each of the elongated tube members 510 and 520 such that the wheel shield apparatus 500 is weighed down and kept in contact with the floor in order to gently knock cables out of the path of the machinery wheel. In some embodiments, each of the pair of elongated tube members 510 and 520 include a pair of caps (not shown, but analogous to caps 116 of FIG. 5) to prevent leakage or shifting of the ballast material. It should be noted that the ballast material must be deliberately measured and placed within each of the pair of elongated tube members 510 and 520 to provide a balanced weight to the wheel shield apparatus 500 so that the wheels of the machinery do not turn or rotate incorrectly when being transported. In some embodiments, the ballast material may include sand, BBs or some other suitable ballast material. Analogous to that of FIG. 3, an underside of the wheel shield apparatus 500 may in some embodiments be coated with a slidable material such as Ultra High Molecular Weight Polyethylene (UHMW) tape to protect the floor and lower a coefficient of friction of the underside so that the wheel shield apparatus 500 moves easily with the machinery wheel. It should be noted that the application of the slidable material should not interfere with the connectivity or removal of various components of the wheel shield apparatus 500.

Figure 27:
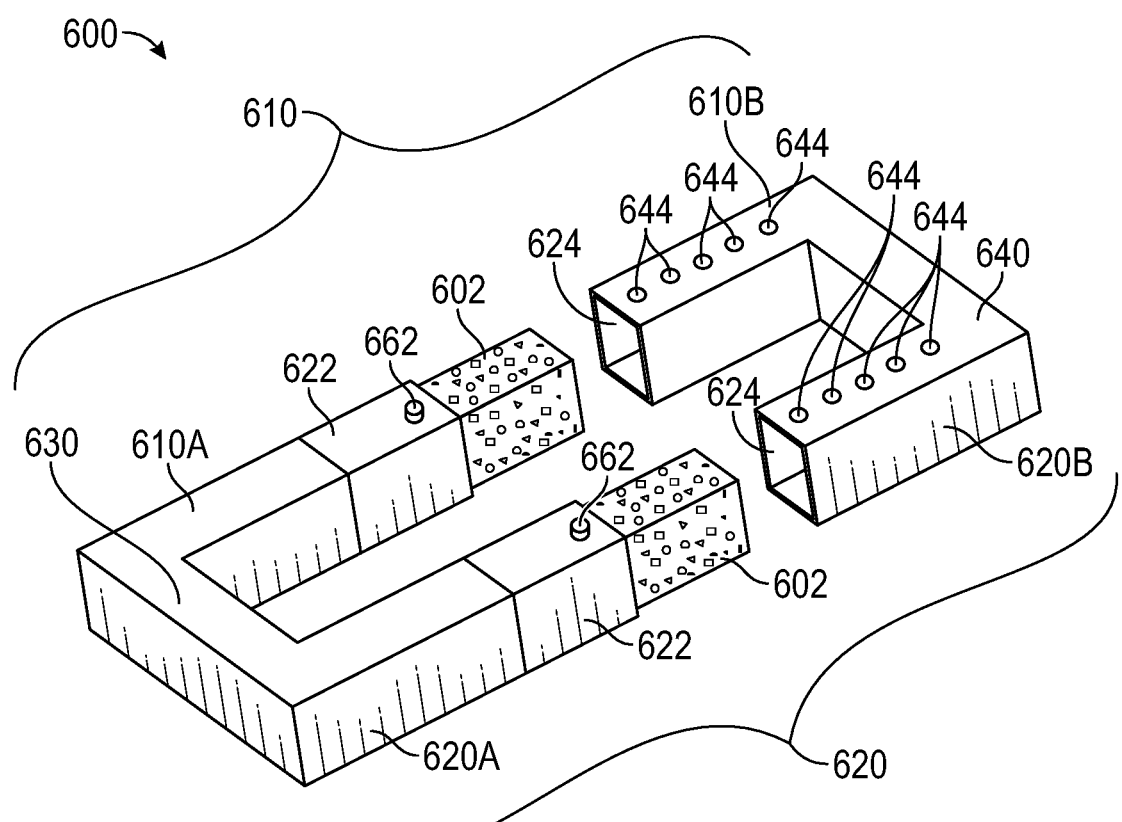
FIG. 27 is an exploded perspective view showing a sixth embodiment of a wheel shield apparatus having an extendable length.
Figure 29:
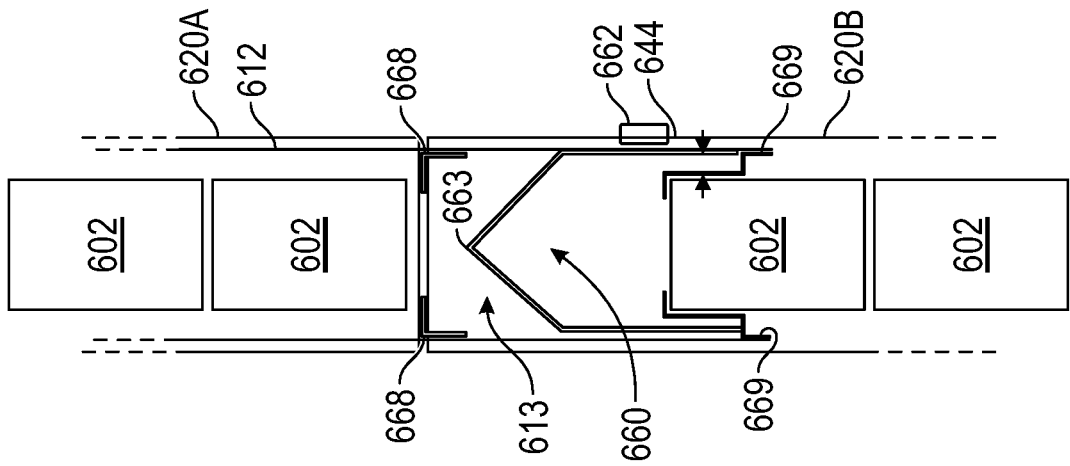
FIG. 29 is a cross-sectional side view showing the button clip assembly of FIG. 28.
Figure 28:
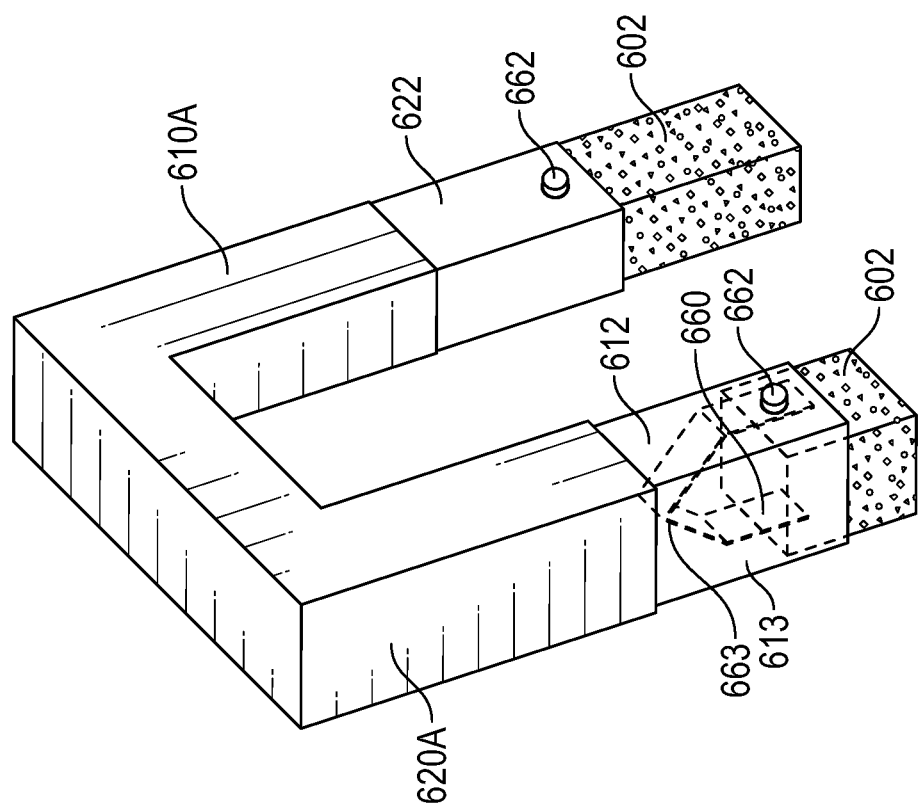
FIG. 28 is a perspective view showing view showing a button clip assembly of the wheel shield apparatus of FIG. 27.

FIGS. 27-29 illustrate a sixth embodiment of a wheel shield apparatus 600. Wheel shield apparatus 600 can include aspects of previous embodiments but can also be configurable for extendable length. As illustrated in FIG. 27, wheel shield apparatus 600 includes a first elongated tube member 610 and a second elongated tube member 620 in perpendicular engagement with a first short tube member 630 and a second short tube member 640. First elongated tube member 610 and second elongated tube member 620 are configured for variable length to accommodate casters or wheels of variable diameter. As shown, first elongated tube member 610 can be divided into a first portion 610A and a second portion 610B. Similarly, second elongated tube member 620 can be divided into a first portion 620A and a second portion 620B. Each first portion 610A and 620A of first and second elongated tube members 610 and 620 are associated with a respective inner sheath section 622, as shown in FIG. 27. Inner sheath sections 622 are each associated with a button clip 660 (FIG. 28) for engagement with a respective second portion 610B and 620B of the first and second elongated tube member 620A and 620B. Each second tube member 610B and 620B includes an open end 624 for insertion of each respective inner sheath section 622, and a plurality of apertures 644 for engagement with a button 662 of button clip 660. As further illustrated, each elongated tube member 610A and 610B includes ballast material 602.

Referring to FIGS. 28 and 29, each button clip 660 is disposed within a cavity 613 of each respective first portion 610A and 620A of first and second elongated tube members 610 and 620. For simplicity, button clip 660 and associated components will be discussed in terms of the second elongated tube member 620 in FIGS. 28 and 29, but it should be noted that button clip 660 and associated components also apply to first elongated tube member 610. Button 662 of button clip 660 engages with a aperture 644 of the plurality of apertures 644 of the second portion 620B and is tensioned such that the second portion 620B cannot be de-coupled from the first portion 620A of second elongated tube member 620 unless button 662 is manually pressed into cavity 613. In some embodiments, button clip 660 can be a strip of tensioned metal bent to form an apex 663.

Referring directly to FIG. 29, button clip 660 is shown disposed within the cavity 613 of the second elongated tube member 620 (it should be noted that components described herein are also applied to first elongated tube member 610). Second elongated tube member 620 includes ballast materials 602 which can be sectioned into individual "blocks" of variable size and weight for insertion or removal from second elongated tube member 620. The partitioning of the ballast 602 allows for ease of insertion or removal depending on the intended length of the first and second elongated tube members 610 and 620, in addition to being readily contained so as not to interfere with operation of the button clip 660. The ballast material 602 can be contained by upper and lower brackets 668 and 669. In the embodiment shown, upper brackets 668 associated with the first portion 620A of the second elongated tube member 620 are intended to prevent ballast material 602 from migrating towards and interfering with the button clip 660. Lower brackets 669 are associated with the second portion 620B of the second elongated tube member 620 and prevent ballast material 602 from migrating towards the apex 663 of the button clip 660. To properly function, button 662 of button clip 660 must have at least enough clearance between the second portion 620B and the ballast 602 such that the button 662 can be pushed fully into the cavity 613 of the second elongated tube member 620. Because of this, lower brackets 669 are configured to restrict movement of ballast 602 to provide adequate clearance between the second elongated tube member 620 and the ballast 602.

To extend a length of the wheel shield apparatus 600, buttons 662 must be pushed into their respective cavities 613 of both the first elongated tube member 610 and the second elongated tube member 620. First and second portions 610A and 610B (and 620A and 620B) can then be pulled apart until a desired elongated length is reached and the buttons 662 are released to extend through one of the apertures 644 of the second portions 610B and 620B of the first and second elongated tube members 610 and 620. An appropriate amount of ballast 602 can be inserted to add additional weight. To shorten a length of the wheel shield 600, the process is the same, with the exception of the first and second portions 610A and 610B (and 620A and 620B) being pushed together until a desired shortened length is reached.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A wheel shield apparatus comprising:
   a first elongated tube member in perpendicular engagement with a first short tube member and a second short tube member, a second elongated tube member in perpendicular engagement with the first short tube member and the second short tube member such that the first elongated tube member, second elongated tube member, first short tube member, and second short tube member collectively form a rectangular frame defining an interior space; and
   a ballast material disposed within a cavity defined by at least one of the first elongated tube member, the second elongated tube member, the first short tube member and/or the second short tube member;
   wherein at least one of the first elongated tube member, the second elongated tube member, the first short tube member and/or the second short tube member is operable to be removed and replaced such that the wheel shield apparatus is configured for capturing and retaining a wheel of machinery within the interior space defined by the generally rectangular frame of the wheel shield apparatus.

2. The wheel shield apparatus of claim 1, further comprising:
   a plurality of connectors coupled to the first tube member and second tube member, wherein each connector of the plurality of connectors comprises a button pin for engagement with a pin aperture of the first short tube member or a pin aperture of the second short tube member;
   wherein each connector of the plurality of connectors is configured for engagement with and removal from the first elongated tube member, the second elongated tube member, the first short tube member and the second short tube member.

3. The wheel shield apparatus of claim 2, wherein the first elongated tube member or the second elongated tube member is operable for removal from the wheel shield apparatus by:
   pushing at least two of the plurality of button pins such that the button pins disengage from their respective pin apertures; and
   pulling the first elongated tube member or the second elongated tube away from the first short tube and the second short tube.

4. The wheel shield apparatus of claim 1, further comprising:
   a plurality of caps disposed within the cavity of at least one of the first elongated tube, the second elongated tube, the first short tube and/or the second short tube;
   wherein the plurality of caps seal the ballast material within the cavity of at least one of the first elongated tube member, the second elongated tube member, the first short tube member and/or the second short tube member.

5. The wheel shield apparatus of claim 1, wherein the ballast material is balanced within the generally rectangular frame of the wheel shield apparatus.

6. The wheel shield apparatus of claim 1, further comprising:
   a slidable material applied to a bottom surface of the generally rectangular frame of the wheel shield apparatus, wherein the slidable material provides a low coefficient of friction to an underside of the generally rectangular frame.

7. The wheel shield apparatus of claim 1, further comprising:
   a pair of rollers, wherein each roller of the pair of rollers is configured for free rotation about a horizontal axis A and wherein each roller of the pair of rollers is respectively associated with the first short tube member or the second short tube member.

8. The wheel shield apparatus of claim 7, wherein each roller includes an inner sheath in association with an outer sheath, and wherein the inner sheath and outer sheath collectively encapsulate a tensioning element.

9. The wheel shield apparatus of claim 7, wherein each roller of the pair of rollers includes a roller body in association with a pair of axles, wherein each axle of the pair of axles is associated with a respective end of the roller body.

10. The wheel shield apparatus of claim 1, further comprising:
    a first pinch clip and a second pinch clip defined at opposing ends of the first short tube member or the second short tube member; and
    a first pinch clip receiver associated with the first elongated tube member and a second pinch clip receiver associated with the second elongated tube member, wherein the first pinch clip receiver and the second pinch clip receiver each define a respective clip guide and a respective clip aperture for capturing the first pinch clip or the second pinch clip.

11. The wheel shield apparatus of claim 10, wherein the first short tube member or the second short tube member is operable for disengagement from the wheel shield apparatus by pinching the first pinch clip and the second pinch clip towards a center of the wheel shield apparatus and pulling the first short tube member or the second short tube member away from the first elongated tube member and the second elongated tube member.

12. The wheel shield apparatus of claim 1, further comprising:
    a hinge associated with the first short tube member and the first elongated tube member; and
    a latch associated with the first short tube member and the second elongated tube member;

wherein the hinge is operable for rotation about a vertical axis B such that the first short tube member is rotated in a clockwise or counterclockwise direction away from the second elongated tube member.

13. The wheel shield apparatus of claim 12, wherein the first short tube member is operable for disengagement from the wheel shield apparatus by unlatching the latch and rotating the first short tube member away from the second elongated tube member.

14. The wheel shield apparatus of claim 1, wherein the first elongated tube member and the second elongated tube member are each partitioned into a first portion and a second portion, wherein each first portion comprises:
 a button clip of a pair of button clips, wherein each button clip of the pair of button clips are disposed within the first portion of the first elongated tube member and the first portion of the second elongated tube member;
 wherein each second portion comprises:
 a plurality of apertures configured for engagement with a button clip of the pair of button clips;
 wherein an engagement of respective first second portions of the first elongated tube member and the second elongated tube member is such that a length of the first elongated tube member and a length of the second elongated tube member are variable.

15. The wheel shield apparatus of claim 14, wherein a length of the first elongated tube member and the second elongated tube member is lengthened or shortened by pushing a button of each respective button clip into the respective first elongated tube member and the second elongated tube member and pushing or pulling the first and second portions of each respective first elongated tube member and second elongated tube member relative to one another.

* * * * *